E. MAYNZ.
Lacing-Hook.

No. 202,564. Patented April 16, 1878.

WITNESSES.
F. F. Raymond 2d
A. J. Oettinger

INVENTOR
Edw. Maynz

UNITED STATES PATENT OFFICE.

EDWARD MAYNZ, OF BOSTON, MASSACHUSETTS.

IMPROVEMENT IN LACING-HOOKS.

Specification forming part of Letters Patent No. 202,564, dated April 16, 1878; application filed March 21, 1878.

*To all whom it may concern:*

Be it known that I, EDWARD MAYNZ, of Boston, in the county of Suffolk and State of Massachusetts, have invented an Improvement in Lacing-Hooks, of which the following is a specification:

This invention is an improvement upon the lacing-hook patented to me December 25, 1877, No. 198,646; and it consists in a lacing-hook provided with one or two fastening-prongs, instead of three, as therein set forth; for I have found, in the course of experiment, that two fastening-prongs will answer in securing the hook in position about as well as three, as the strain, when in use, comes from the end of the hook, and not from the top, thereby not requiring a third prong at the base of the hook, as shown in said Letters Patent, but exerting the entire strain upon the two prongs at the forward end of the hook.

One prong will, in some instances, answer almost as well, when located at the front of the hook, as two.

Figure 1:
Figure 2:
Figure 3:
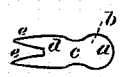
Figure 4:
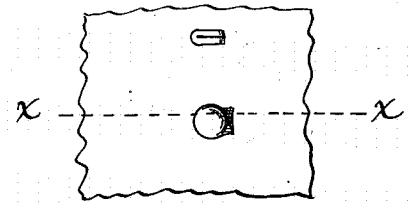
Figure 5:
Figure 6:
Figure 7:

In the drawings, Figure 1 is a perspective of lacing-hook. Fig. 2 is an elevation of the same. Fig. 3 shows a blank from which it is formed. Fig. 4 represents a hook fastened in position. Fig. 5 is a cross-section on the line *x x*. Fig. 6 is a view of a hook when made from wire. Fig. 7 is a plan of a blank for forming the modification shown in Fig. 8.

As in the patented lacing-hook, I prefer to form the lacing-hook herein described from a blank cut from a thin sheet of brass or some other soft-metal composition, and then to shape it by suitable mechanism to the complete article shown in Fig. 1.

This blank consists of the portion *a*, rounded upon its exterior, and somewhat depressed at *b* to form the top of the hook, the narrower portion *c*, forming the end or neck of the hook, and the enlarged section *d*, forming the base, resting upon the material from which the prongs *e* extend longitudinally.

Figure 8:
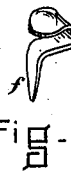

In some instances it may be desirable to use the one prong *f*, as shown in Fig. 8, instead of the two prongs *e*.

In securing the lacing-hook in position, the prongs *e* are passed through the material, to which it is fastened and bent over and clinched on the opposite side, as shown in Fig. 5.

In order that the prongs may more easily penetrate the material and clinch, I taper the same upon the face and back of the prong, as shown in Fig. 2. This form of hook can also readily be made from wire by simply bending the wire at the center of its length, and then forming said doubled wire into a hook shape, with the two prongs bent at right angles to the base of the hook and properly sharpened to penetrate the material. Such a hook is shown in Fig. 6.

By the construction herein described, an economy in the use of material is effected without interfering with the utility of the article; for in manufacturing the three-pronged hook before referred to it is necessary to use at least one-seventh more stock in order to provide enough for the central prong. Also, it makes a lighter and handsomer article than the same, as the base of the hook does not extend beyond the top of the same, as it does in the lacing-hook referred to.

It will be seen that, when one prong is used, by making it sufficiently broad at the top it will serve almost as well in securing the hook to the material as though the two prongs were employed; for by making it of sufficient width or breadth the hook is firmly fastened in the material, and prevented from swiveling or turning in the same, whereas if it were a round prong it would be impracticable for ordinary use, as it would be apt to turn very readily, instead of being stationary, as is necessary.

I claim as my invention and desire to secure by Letters Patent—

A lacing-hook struck up from sheet metal, one end of which constitutes the hook portion, and the opposite end terminating in a fastening prong or prongs, substantially as shown and described.

EDWD. MAYNZ.

Witnesses:
F. F. RAYMOND, 2d,
A. J. OETTINGER.